(12) United States Patent
Ritchie et al.

(10) Patent No.: US 7,319,514 B2
(45) Date of Patent: Jan. 15, 2008

(54) OPTICAL INCLINATION SENSOR

(75) Inventors: Norman Wayne Ritchie, Blacksburg, VA (US); Stephen E. Hester, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 386 days.

(21) Appl. No.: 11/020,956

(22) Filed: Dec. 23, 2004

(65) Prior Publication Data

US 2006/0139626 A1 Jun. 29, 2006

(51) Int. Cl.
*G01B 11/26* (2006.01)
*G01B 3/56* (2006.01)
(52) U.S. Cl. ......................................... 356/138; 33/534
(58) Field of Classification Search ................ 356/138, 356/147, 149; 33/1 PT, 343, 344, 534
See application file for complete search history.

(56) References Cited

U.S. PATENT DOCUMENTS

| 3,937,078 | A | | 2/1976 | William |
| 3,975,831 | A | * | 8/1976 | Jysky et al. .................... 33/333 |
| 4,185,239 | A | | 1/1980 | Filloux |
| 4,322,829 | A | | 3/1982 | Davis, Jr. et al. |
| 4,534,222 | A | | 8/1985 | Finch et al. |
| 4,726,239 | A | | 2/1988 | Boggess et al. |
| 4,812,654 | A | | 3/1989 | Araaujo |
| 4,893,930 | A | | 1/1990 | Garrett et al. |
| 5,134,283 | A | | 7/1992 | Shiozawa |

(Continued)

FOREIGN PATENT DOCUMENTS

EP 0429378 5/1991

(Continued)

OTHER PUBLICATIONS

Search Report for GB0526390.0. Date of Search: Mar. 14, 2006, Patent Office of Great Britain.

*Primary Examiner*—Roy M. Punnoose
(74) *Attorney, Agent, or Firm*—The H. T. Than Law Group

(57) ABSTRACT

An optical inclination sensor is provided having at least one reflective surface and at least two separate optical fibers having ends spaced from a reflective surface. As the reflective surface tilts with respect to a pre-determined reference position the gap lengths between the fiber ends and the reflective surface change and the differences in these gap lengths is used to calculate an angle of inclination with respect to a reference position. The optical inclination sensor can include at least one mass attached to a housing and moveable with respect to the housing as the mass and housing are rotated about one or more axes. Optical strain sensors are disposed a various locations between the mass and housing so that as the mass moves with respect to the housing, each one of the optical strain sensors are placed in compression or tension. The housing can be a generally u-shaped housing having two arms and a base section with the mass disposed within the housing. Alternatively, the housing includes a first beam, and the mass is a second beam arranged generally orthogonal to the first beam and pivotally attached thereto. The optical strain sensors are disposed between the first beam and the second beam. The optical strain sensors are placed in tension or compression as the second beam pivots with respect to the first beam.

12 Claims, 4 Drawing Sheets

U.S. PATENT DOCUMENTS

| | | | |
|---|---|---|---|
| 5,174,035 A * | 12/1992 | Yamazaki | 33/395 |
| 5,317,929 A | 6/1994 | Brown et al. | |
| 5,883,308 A | 3/1999 | Fersht | |
| 5,883,817 A | 3/1999 | Chisholm et al. | |
| 6,012,337 A | 1/2000 | Hodge | |
| 6,384,919 B1 | 5/2002 | Fersht et al. | |
| 6,496,264 B1 | 12/2002 | Goldner et al. | |
| 6,563,967 B2 | 5/2003 | Tweedy et al. | |
| 2003/0095249 A1 | 5/2003 | Ferdinand et al. | |
| 2003/0187581 A1 | 10/2003 | Brune et al. | |
| 2005/0169568 A1 | 8/2005 | Shang | |

FOREIGN PATENT DOCUMENTS

| | | |
|---|---|---|
| JP | 56107112 | 8/1981 |
| JP | 57158510 | 9/1982 |

* cited by examiner

OPTICAL INCLINATION SENSOR

FIELD OF THE INVENTION

This invention generally relates to sensors for measuring angles of inclination. More particularly, the present invention relates to inclination sensors utilizing optical interferometers.

BACKGROUND OF THE INVENTION

Tilt meters or tilt sensors are used in the geophysical sciences and other applications to measure tilt or inclination of the ground or of structures. These measurements can be taken at the surface or, particularly in the case of geophysical applications, below the surface of the Earth in, for example, gas or oil wells. In these applications, the tilt meters are used to provide information about the general shape of a well or of sudden turns in the well. For example, oil wells can extend 10,000 or 30,000 feet below the surface of the Earth. At these depths, the wells can develop helical or corkscrew bores. These bores need to be monitored and tracked during the drilling process. In addition, highly sensitive tilt sensors are used in oil and gas wells to detect subtle changes in the Earth's structure, to measure subsidence, shifting or the quality or effects of nearby fracturing operations.

In general, tilt sensors are arranged to provide an indication of when the sensor changes orientation with respect to a predetermined reference, for example tilting with respect to horizontal, vertical or with respect to the direction of the Earth's gravitational pull. These sensors can provide a simple indication of tilt or can be calibrated to provide a measurement of the degree of tilt. Conventional tilt sensors are electronic devices that utilize a pendulum type sensor or a magnetic resistance element. Other types of tilt sensors include potentiometer type, servo type, bubble type, capacitance type and mercury type.

Other types of tilt sensors have combined optical elements with electronic elements. For example, U.S. Pat. No. 4,726,239 is directed to a soil analyzer and penetrator that includes a cone connected to the lower end of a hollow tube for measuring various ground parameters. A cone angle measuring device, which is an optical tilt meter, includes a light source, a photo sensor and a concave lens positioned between the light source and photo sensor. A steel ball rides on the concave surface of the lens. Therefore, the light from the source is limited in reaching the sensor depending upon the position of the ball. As the sensor is tilted, the ball rolls on the concave surface of the lens allowing more light to pass. Therefore, the output from the photo sensor is proportional to the angle of tilt of the sensor and thus of the cone.

Similarly, U.S. Pat. No. 5,134,283 is directed to an optical detection apparatus whereby the tilting state, such as rolling or pitching state, of an object, may be detected by a simplified optical system. The optical detection apparatus includes a light emitting element provided at distal end of a moveable member for radiating light downwards. A condenser lens is mounted below the moveable member, and a photo sensor device, for example a photodiode device, is mounted below the condenser lens. A signal processing circuit determines the position on the photo sensor device of a light spot from the condenser lens.

One system utilizes optical fibers in combination with conventional electronic optical detectors. U.S. Pat. No. 4,812,654 is directed to a two-axis quartz fiber passive tilt meter utilizing a quartz fiber suspended for emitting radiation from a distal end thereof and a pendulous mass suspended from the quartz fiber to improve the pendulous response. The infrared radiation transmitted and emitted by the quartz fiber is directed by a lens system to strike an axially displaced position on a detector producing DC signals representative of the intensity of light falling on the respective detector quadrants.

The combined systems still utilize electronic components that limits how small or compact the sensor can be. In addition, electronic sensors can be influenced by electromagnetic effects, temperature and signal attenuation, especially in deep well applications.

Therefore, a need exists for a tilt meter that is compact and suited for subsurface measurements. The tilt meter would obviate the need for electronic components located distally at the point of measurement, thereby eliminating electromagnetic interference.

SUMMARY OF THE INVENTION

The present invention is directed to an optical inclination sensor having at least one reflective surface and at least two separate optical fibers having ends that are spaced from the reflective surface. As the reflective surface tilts with respect to a pre-determined reference position or around a pre-determined axis, the gap lengths between the fiber ends and the reflective surface change and the differences in these gap lengths are used to calculate an angle of inclination with respect to the reference position or axis. The optical inclination sensor provides a resolution in gap length as low as about 0.1 nm. In general, the optical inclination sensor operates as an interferometer, either intrinsic or extrinsic, to measure these differences in gap length.

The optical fibers are fixedly attached to a housing, so as to rotate or tilt with the housing. The housing can be arranged as a generally u-shaped capillary tube, and the reflective surface is the surface of a liquid, for example mercury, disposed in the capillary tube. In addition, the optical inclination sensor can include more than two optical fibers, and the housing can include a manifold assembly containing a sufficient number of ports to hold each optical fiber.

The present invention is also directed to an optical inclination sensor that includes at least one mass attached to a housing or frame and moveable with respect to the housing as the mass and housing are rotated about one or more axes. Optical strain sensors are disposed at various locations between the mass and housing so that as the mass moves with respect to the housing, each one of the optical strain sensors are placed in either compression or tension. The compression and tension of the optical strain sensors are used to calculate an angle of inclination of the housing and mass with respect to each axis.

The optical strain sensors are arranged as pairs and positioned so that one optical sensor is in compression when the other optical sensor is in tension as the mass and housing rotate about a given axis. The housing can be a generally u-shaped housing having two arms and a base section. Each optical strain sensor is disposed between the mass and one of the two arms, and the mass is moveably attached to the base section. Suitable optical strain sensors include (i) extrinsic Fabry Perot interferometers having a gap comprising a predetermined length and each sensor is attached between the mass and the housing so that movement of the mass with respect to the housing changes the length of each gap and (ii) intrinsic optical sensors such as a fiber Bragg grating, among others.

In another embodiment, the housing is arranged as a first beam, and the mass is a second beam aligned generally orthogonal to the first beam and pivotally coupled thereto. The optical strain sensors are disposed between the first beam and the second beam. The optical strain sensors are placed in tension or compression as the second beam pivots with respect to the first beam.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

A fiber optic inclination sensor or tilt meter in accordance with one aspect of the present invention includes two or more optical fibers, each having a cleaved fiber end face that is placed in proximity to a reflective tiltable surface. As used herein, a tiltable surface is a surface that maintains a consistent horizontal level even when, for example, a container or housing in which the surface and the fibers are disposed, is tilted. Suitable tiltable surfaces include spring loaded or biased surfaces and liquid surfaces, for example the surface of mercury, water-based liquids, or oils. If mercury is used, care should be taken so that the surface tension between mercury and the walls of the container do not affect the flatness of the tiltable surface. Each optical fiber end face is spaced from the reflective surface by a predetermined gap length.

Figure 1:
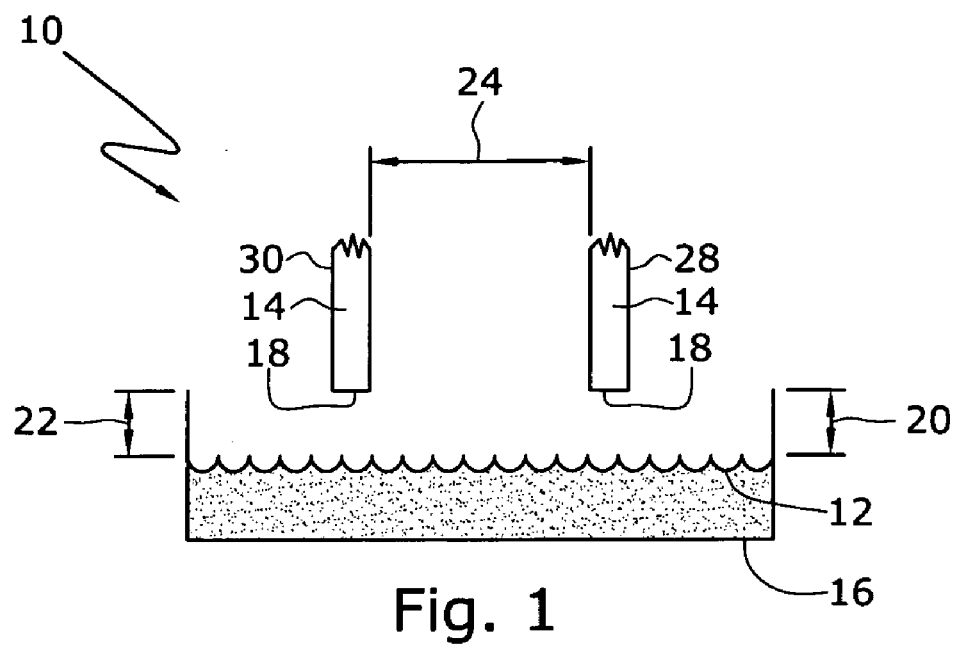
FIG. 1 is a schematic representation of one embodiment of the optical inclination sensor in accordance with the present invention.

Referring initially to FIG. 1, optical tilt or inclination sensor 10 in accordance with an embodiment of the present invention is illustrated. Optical inclination sensor 10 includes at least one reflective surface 12 and at least two separate optical fibers 14. As illustrated, reflective surface 12 is disposed within housing or frame 16, and optical fibers 14 are fixed with respect to housing 16. Suitable materials for housing 16 are materials that are compatible with the environment, including temperature and pressure, in which optical sensor 10 is used. These materials include metals, polymers, sapphire, alumina, plastics and combinations thereof. Preferably, housing 16 is constructed from a material that will not deform in response to the environmental conditions. Optical fibers 14 are fixed to housing 16 using methods including conductive heating, arc welding, laser welding, or using FRIT glass or solder glass. Alternatively, optical fibers 14 can be fixedly attached to housing 16 using molecular, epoxy, or anodic attachment mechanisms.

Reflective surface 12 can be any surface or the surface of any substance that maintains its orientation with respect to a pre-determined reference position, axis or frame-of-reference when housing 16 is rotated with respect to that pre-determined reference position, axis or frame-of-reference. Suitable reflective surfaces include mirrored glass or metallic surfaces that are magnetically biased, spring loaded or gimbaled and can be constructed from semiconductor materials or using microeletromechanical (MEMS) techniques. Preferably, reflective surface 12 is the surface of a liquid. Suitable liquids surfaces have an index of refraction that is sufficient to cause the surface to act as a least a partially reflective surface to the wavelength of light incident thereon. In addition, the liquid should be sufficiently dense to provide a surface that is smooth and stable and not overly sensitive to slight motions and vibrations. Also, the liquid should be compatible with the materials of housing 16 and optical fibers 14. Preferably, the liquid should be reflective, such as mercury, or have a high index of refraction and hence a high reflectivity. The liquid can be water-based or oil-based.

Suitable optical fibers 14 include single mode fibers, multimode fibers, polarization maintaining fibers, plastic fibers and coreless fibers. Preferably, optical sensor 10 does not include any remotely located electronic components to measure tilt. Remotely located electronic components are defined as components located at the point where tilt or angle of inclination is to be measured. Therefore, optical sensor 10 is not adversely affected by electromagnetic effects found in subsurface applications. Measurement of tilt with optical sensor 10 is accomplished by passing light through optical fibers 14 and reflecting at least a portion of that light off reflective surface 12 and back through optical fibers 14. Therefore, optical sensor 10 includes an interferometer. In one embodiment, optical sensor 10 includes an extrinsic Fabry Perot interferometer (EFPI).

As illustrated, optical fibers 14 are spaced apart by a distance 24. Each optical fiber 14 is arranged with end 18 spaced from reflective surface 12. As illustrated, optical fibers 14 are spaced from reflective surface 12 by gaps having a first gap length 20 and a second gap length 22. First and second gap lengths 20, 22 have initial values that provide for a sufficient amount of tilt or movement of reflective surface 12 with respect to ends 18. First and second gap lengths 20, 22 can have an initial value (FIG. 1) that is either equal or different.

Figure 2:
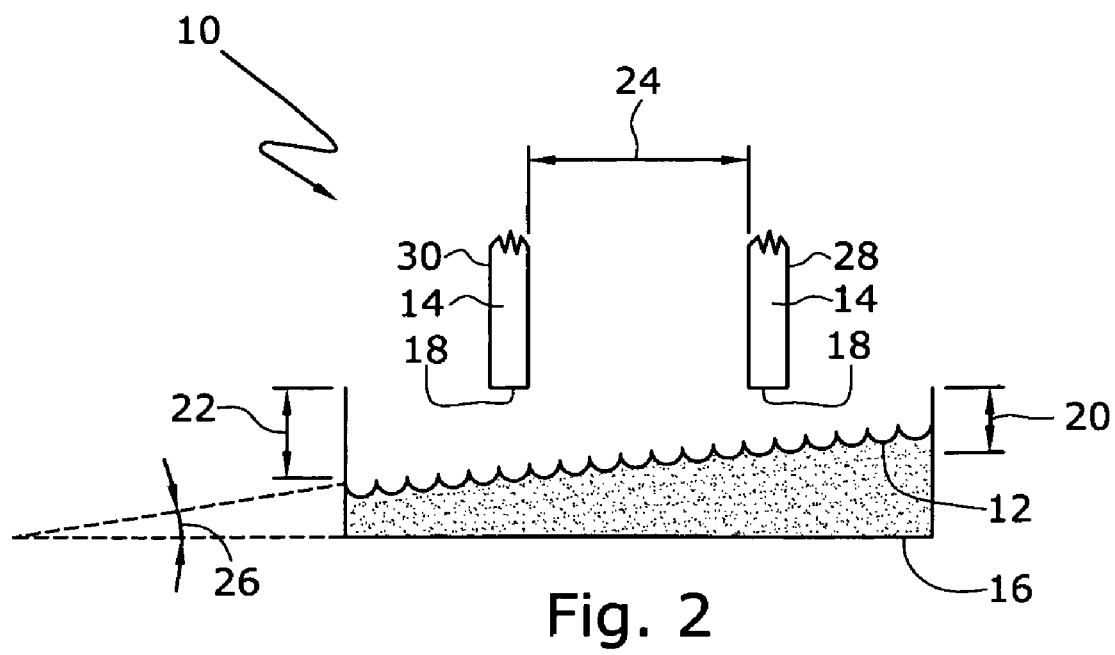
FIG. 2 is a schematic representation of that optical inclination sensor in an inclined position.

As is illustrated in FIG. 2, housing 16 and optical fibers 14 rotate about the pre-determined reference position, for example about one or more axes. Since optical fibers 14 are fixed to housing 16, when housing 16 rotates, optical fibers 14 rotate, maintaining a consistent orientation among housing 16 and optical fibers 14. However, reflective surface 12 maintains its orientation with the desired reference frame and moves relative to optical fibers 14 and housing 16. As reflective surface 12 moves relative to optical fibers 14, first and second gap lengths 20, 22 change. This change, and in particular the difference between first and second gap lengths 20, 22 associated with optical fibers 14 is used to calculate angle of inclination 26 of optical sensor 10 with respect to the reference position. For example in the embodiment as illustrated, first optical fiber 28 having first gap length 20 ($g_1$) and second optical fiber 30 having second gap length 22 ($g_2$) are separated by distance of separation 24 (L). Angle of inclination 26 ($\theta$) is calculated using the formula $\tan \theta = (g_2 - g_1)/L$. In one embodiment, distance or length of separation 24 is about 2.5 cm, and the difference between second gap length 22 and first gap length 20 is about 0.1 nm.

The measurable angle of inclination 26 is about $0.229 \times 10^{-6}$ degrees.

An advantage of using at least two fibers, e.g., first and second optical fibers 28 and 30, is the avoidance of common mode path length changes due to temperature, pressure or stresses on housing 16.

The resolution of this embodiment of optical sensor 10 depends upon the ability to resolve the changes or differences in first and second gaps lengths 20, 22. In one embodiment, optical sensor 10 has a resolution for changes in gap length of less than about 1 nm. Preferably, optical sensor 10 has a resolution for changes in gap length of about 0.1 nm, corresponding to angular resolution in the nano-radian range. This resolution and first and second gap lengths 20, 22 are measured using the interference patterns generated by the interferometer.

Figure 3:
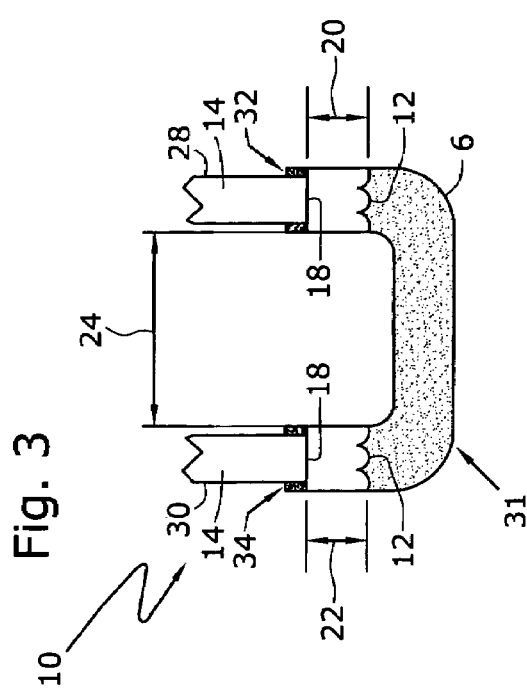
FIG. 3 is a schematic representation of another embodiment of the optical inclination sensor.

Various arrangements of housing 16 and optical fibers 14 can be used depending upon the requirements and space limitations of the optical sensor 10 application. In one embodiment as illustrated in FIG. 3, housing 16 is a generally u-shaped capillary tube 31 having first end 32 in which first optical fiber 28 is disposed, and second end 34 in which second optical fiber 30 is disposed. The liquid is disposed in capillary tube 31, and optical fibers 14 are fixedly attached to the respective ends 32, 34 of capillary tube 31. Each optical fiber 14 can be sealed in respective ends 32, 34 of capillary tube 31 so that the gaps contain a partial vacuum. In this embodiment, distance of separation 24 is equivalent to the spacing between first and second ends 32, 34 of capillary tube 31. In one embodiment, spacing 24 between ends of capillary tube 31 is about 2.5 cm, and the difference between the gap lengths 20, 22 is about 2.2 mm. The measurable angle of inclination 26 is about 5 degrees.

Figure 4:
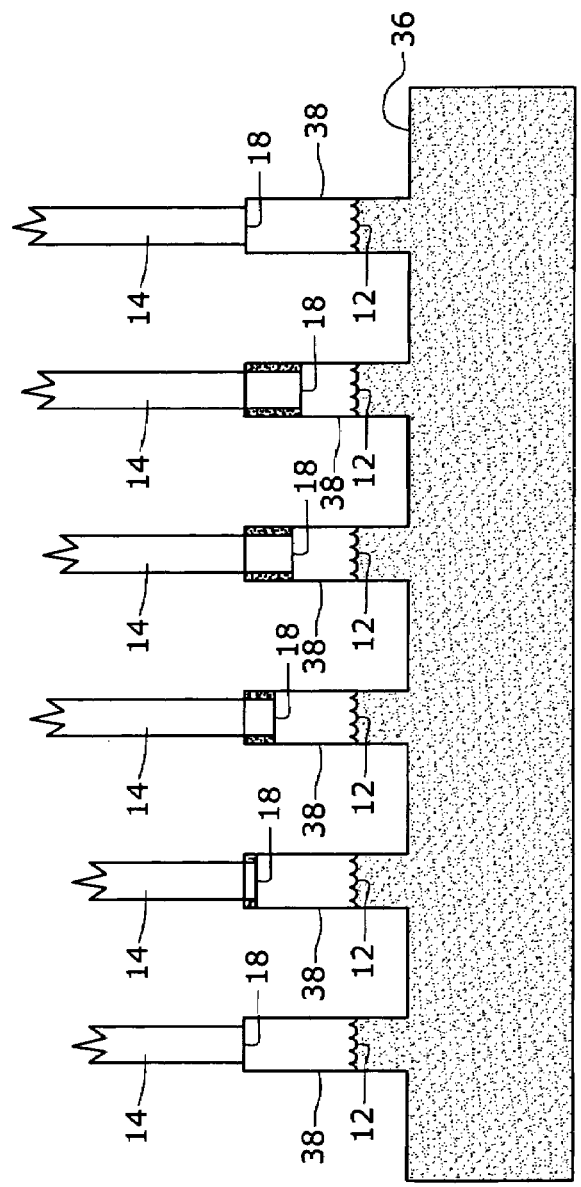
FIG. 4 is a schematic representation of yet another embodiment of the optical inclination sensor.

In another embodiment as illustrated in FIG. 4, optical sensor 10 includes a plurality of optical fibers 14. Each optical fiber 14 end 18 is spaced from reflective surface 12. In one embodiment, all of the gap lengths are equal. In another embodiment at least two or more of the gap lengths are different. Alternatively, all of the gap lengths can be different. In order to provide for attachment of plurality of fibers 14 to housing 16, optical sensor 10 includes manifold assembly 36 containing at least two ports 38. Preferably, a sufficient number of ports 38 are provided so that each optical fiber 14 is disposed in one port 38. Materials for manifold assembly 36 and methods for attaching optical fibers 14 to ports 38 are the same as discussed above for housing 16. The measurable angle of inclination is a function of the spacing 24 between any two fibers and the gaps between said fibers and the reflective surface.

Figure 5:
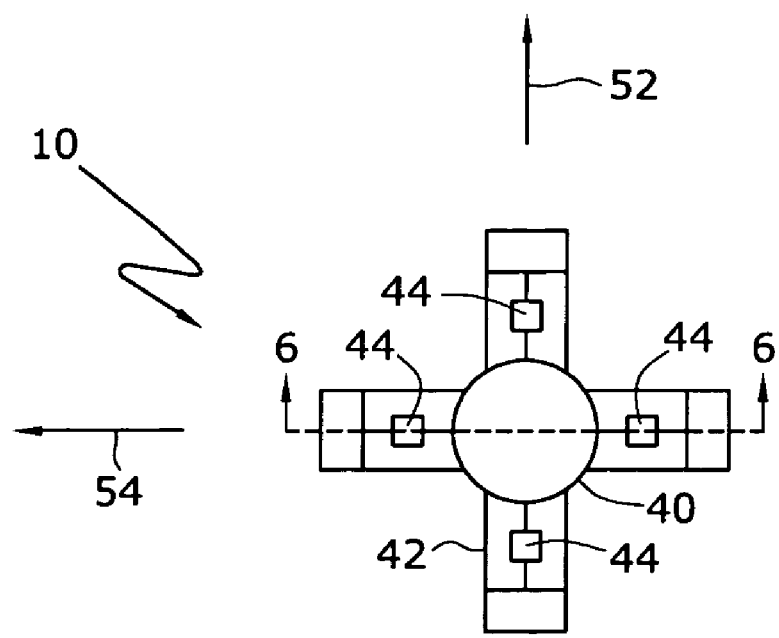
FIG. 5 is a plan view of an embodiment of the optical inclination sensor in accordance with the present invention.
Figure 6:
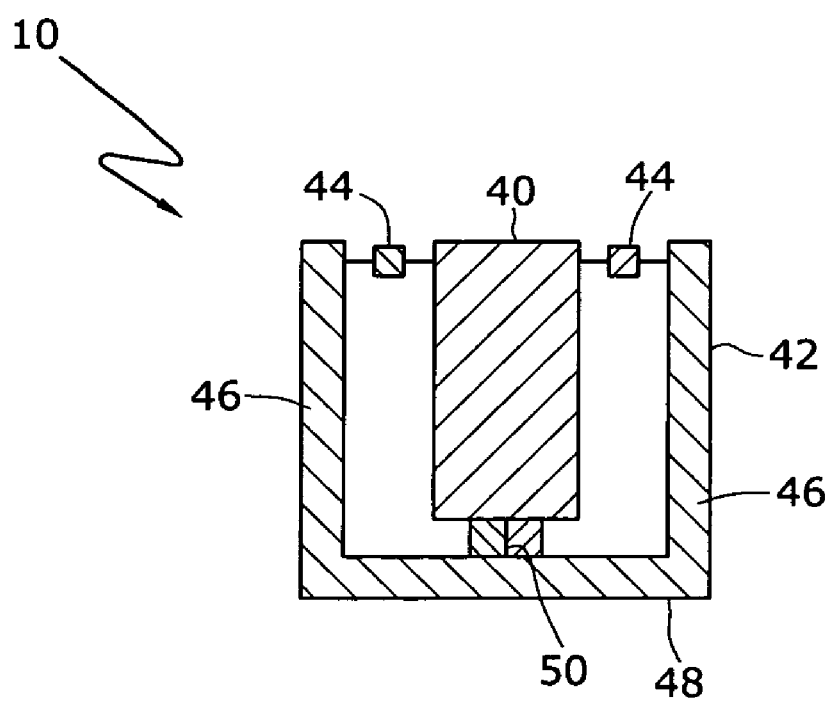
FIG. 6 is a view through line 6-6 of FIG. 5.
Figure 7:
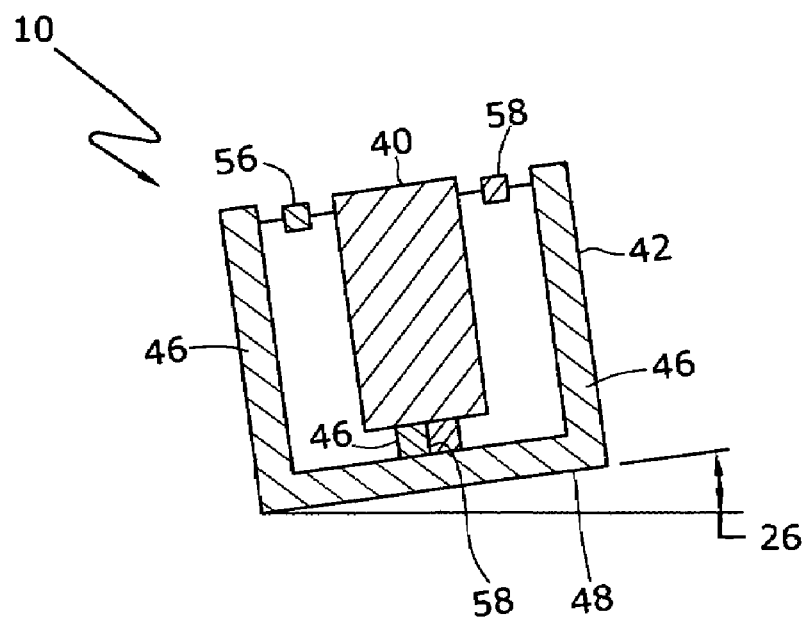
FIG. 7 is the cross-sectional view of FIG. 6 in an inclined position.

In another embodiment as illustrated in FIGS. 5-7, optical inclination sensor 10 includes mass 40 attached to frame or housing 42. Mass 40 is moveable relative to housing 42. Suitable materials for mass 40 include metal or other sufficiently dense materials so that mass 40 will move with respect to housing 42 as mass 40 and housing 42 are rotated about one or more axes. Mass 40 can be arranged as any shape that fits within housing 42. In one embodiment, mass 40 is cylindrical. Housing 42 can be constructed from the same material as mass 40 or from a different material. Suitable shapes for housing 42 include cup shapes and one or more intersecting u-shaped arms. In one embodiment, housing 42 is generally u-shaped, having two or more upstanding arms 46 and each pair of arms 46 connected by base section 48. An optical strain sensor 44 is disposed between mass 40 and one of the arms 46. Mass 40 is moveably attached to base section 48. In one embodiment, mass 40 is pivotally attached to base section 48. In another embodiment, mass 40 is attached to base section 48 by one or more elastic tethers 50.

At least two optical strain sensors 44 are disposed between mass 40 and housing 42 at two separate and preferably opposite locations. Suitable optical strain sensors include, but are not limited to, an EFPI and intrinsic optical sensors such as fiber Bragg gratings. In one embodiment, each optical strain sensor 44 is an EFPI having a gap comprising a predetermined length, and each sensor 44 is attached between mass 40 and housing 42 so that movement of mass 40 with respect to housing 42 changes the length of each gap. In general, strain sensors 44 are arranged to provide for strain measurements as mass 40 moves with respect to housing 42 when mass 40 and housing 42 are rotated about one or more axes. As mass 40 moves with respect to housing 42, each optical strain sensor 44 is placed in compression or tension. The compression and tension of optical strain sensors 44 are used to calculate angle of inclination 26 of housing 42 and mass 40 with respect to each axis and hence angle of inclination 26 of optical sensor 10.

In one embodiment, optical strain sensors 44 are arranged in pairs and opposite to each other. At least two optical strain sensors 44 are disposed between mass 40 and housing 42 for each axis about which sensor 10 can be rotated. As illustrated, two sets of pairs of optical strain sensors 44 are provided and arranged to measure tilt about first axis 52 and second axis 54. As illustrated in FIG. 7, when optical sensor 10 tilts with respect to first axis 52 by angle of inclination 26, first optical sensor 56 is in compression when second optical sensor 58 is in tension.

Although optical inclination sensor 10 provides a higher degree of sensitivity and accuracy when applied in a stationary or static state, in one embodiment a spin or rotation is imparted to optical sensor 10. In the embodiment illustrated in FIGS. 5-7, both mass 40 and housing 42 are rotated about an axis. When the axis is vertical or perpendicular to first axis 52 and second axis 54, the forces, i.e. tension and compression, acting on optical strain sensors 44 are constant and equal. When the axis of rotation is tilted away from the vertical axis, the forces acting on the sensors become uneven, i.e., when the mass is rotated through the lower arc the applied force has a vertical component parallel with gravity and when the mass is rotated through the upper arc the applied force has a vertical component in the opposite direction as gravity. The degree of tilt is directly related to the difference between the highest and lowest applied force. In another embodiment, a single mass 40 connected to a rotating spindle via an optical strain gage can be used. Again, the tilt is related to the difference between the highest measured strain and the lowest measured strain.

Suitable motors to rotate the mass and/or housing include a small electric or electromagnetic motor and servo motors. The rotational rate of mass 40 and housing 42 can be varied to vary the sensitivity of optical sensor 10. In other words, when the tilt angle is relatively small, higher rotational rate increases sensitivity of the sensor.

Figure 8:
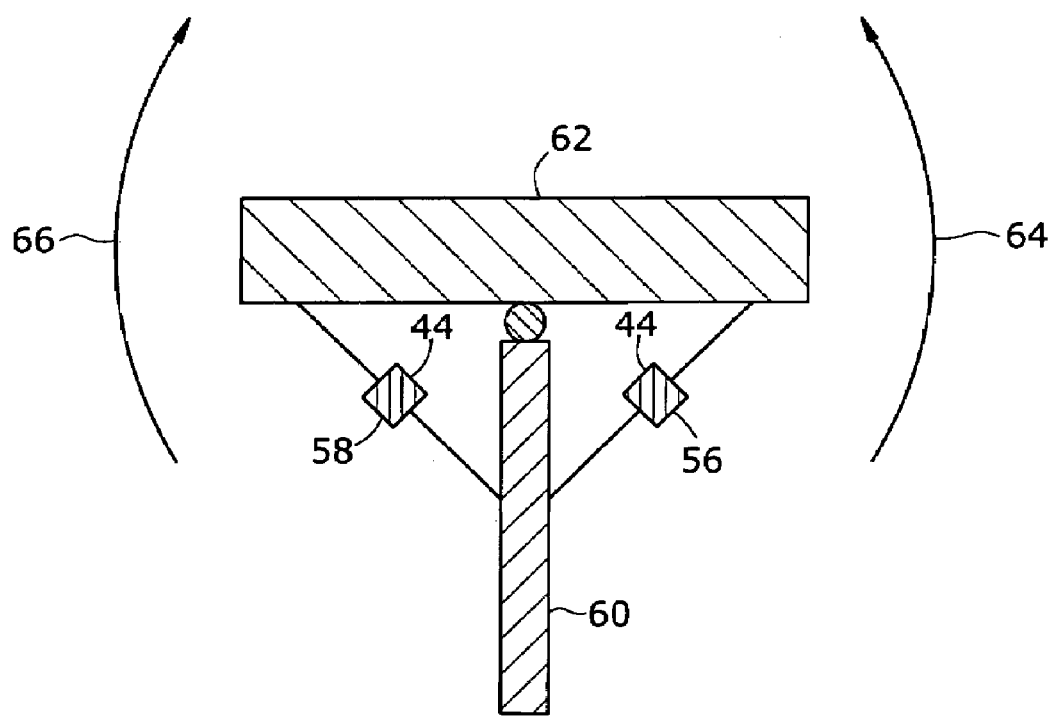
FIG. 8 is a cross-sectional view of another embodiment of the optical inclination sensor.

In another embodiment as illustrated in FIG. 8, housing 42 is arranged as first beam 60 and mass 40 is arranged as second beam 62. Second beam 62 is disposed generally orthogonal to first beam 60 and each optical strain sensor 44 is disposed between first beam 60 and second beam 62. Suitable shapes for first beam 60 include cylindrical or rectangular rods, and suitable shapes for second beam 62 include cylindrical or rectangular rods, and rectangular or circular disks. In one embodiment, second beam 62 is pivotally attached to first beam 60. As optical sensor 10 is tilted, second beam 62 pivots with respect to first beam 60 placing optical strain sensors 44 in compression or tension. As illustrated, first optical strain sensor 56 is in compression and second optical strain sensor 58 is in tension when second beam 62 pivots with respect to first beam 60 in first direction 64. Conversely, first optical strain sensor 56 is in tension and second optical strain sensor 58 is in compression when second beam 62 pivots with respect to first beam 60 in second direction 66.

Optical inclination sensor 10 provides the benefit of high sensitivity in inclination measurements by using interferometry in a completely optical system employing fiber optic telemetry. The need for parallel electrical systems to power and to condition the electronic outputs of the sensors is thereby eliminated (except when an electrical motor is needed to rotate the sensor as described above). High sensitivity is realized by using demodulators to resolve optical phase shifts on the order of micro-radians. Additionally, optical path lengths of tens or hundreds of meters are incorporated in sensors of modest physical dimensions. The combination of high interferometric demodulator resolution and long optical path length creates the possibility of displacement measurements with resolutions on the order of one part in $10^{11}$ to $10^{14}$.

The signals returned by sensor 10 of the present invention can be processed by any known techniques, including but not limited to the processing techniques are disclosed in U.S. Pat. Nos. 5,798,521, 6,545,760 and 6,566,648, among others.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. An optical inclination sensor comprising:
    a mass attached to a housing and moveable relative to the housing as the mass and housing are rotated about at least one; and
    at least two optical strain sensors disposed at two separate locations between the mass and housing;
    wherein as the mass moves with respect to the housing, each one of the optical strain sensors are placed in compression or tension and the compression and tension of the optical strain sensors are used to calculate an angle of inclination of the housing and mass with respect to each axis of rotation.

2. The optical inclination sensor of claim 1, wherein the optical strain sensors are arranged as pairs and positioned so that one optical sensor is in compression when the other optical sensor is in tension as the mass and housing rotate about a given axis.

3. The optical inclination sensor of claim 1, wherein the housing is a generally u-shaped housing having two arms and a base section, each optical strain sensor is disposed between the mass and one of the two arms and the mass is moveably attached to the base section.

4. The optical inclination sensor of claim 3, wherein the mass is pivotally attached to the base section.

5. The optical inclination sensor of claim 3, wherein the mass is attached to the base section by one or more elastic tethers.

6. The optical inclination sensor of claim 1, wherein each optical strain sensor comprises an extrinsic Fabry Perot interferometer having a gap comprising a predetermined length and each sensor is attached between the mass and the housing so that movement of the mass with respect to the housing changes the length of each gap.

7. The optical inclination sensor of claim 1, wherein each optical strain sensor comprises a fiber Bragg grating.

8. The optical inclination sensor of claim 1, wherein the housing comprises a first beam, the mass comprises a second beam arranged generally orthogonal to the first beam and each optical strain sensor is disposed between the first beam and the second beam.

9. The optical inclination sensor of claim 8, wherein the second beam is pivotally attached to the first beam.

10. The optical inclination sensor of claim 8, wherein each optical strain sensor comprises an extrinsic Fabry Perot interferometer having a gap comprising a predetermined length and each sensor is attached between the first and second beams so that movement of the second beam with respect to the first beam changes the length of each gap.

11. The optical inclination sensor of claim 8, wherein each optical strain sensor comprises a fiber Bragg grating.

12. The optical inclination sensor of claim 1, further comprising at least two optical strain sensors disposed between the mass and housing for each axis about which the sensor can be rotated.

* * * * *